United States Patent

Cusano et al.

[11] 4,374,749
[45] Feb. 22, 1983

[54] INDEX-MATCHED PHOSPHOR SCINTILLATOR STRUCTURES

[75] Inventors: Dominic A. Cusano, Schenectady, N.Y.; Robert K. Swank, Colorado Springs, Colo.; Philip J. White, Georgetown, Mass.

[73] Assignee: General Electric Company, Schenectady, N.Y.

[21] Appl. No.: 320,805

[22] Filed: Nov. 12, 1981

Related U.S. Application Data

[60] Division of Ser. No. 169,023, Jul. 15, 1980, Pat. No. 4,316,817, which is a continuation-in-part of Ser. No. 863,856, Dec. 23, 1977, abandoned.

[51] Int. Cl.³ .................... C09K 11/465; C09K 11/24
[52] U.S. Cl. ................ 252/301.36; 252/301.18; 252/301.4 H
[58] Field of Search .............. 252/301.36, 301.4 H, 252/301.18

[56] References Cited

U.S. PATENT DOCUMENTS

| | | | |
|---|---|---|---|
| 2,039,734 | 5/1936 | Meder et al. | 252/301.36 X |
| 2,180,508 | 11/1939 | De Fraine et al. | 252/301.36 |
| 3,023,313 | 2/1962 | De La Mater et al. | 250/488 X |
| 3,213,341 | 10/1965 | Scotti et al. | 250/483.1 |
| 3,342,743 | 9/1967 | Rosenberg | 252/301.36 X |
| 3,459,672 | 8/1969 | Greer | 252/301.36 |
| 3,593,055 | 7/1971 | Geusic et al. | 313/501 |
| 3,822,214 | 7/1974 | Juby | 252/301.36 |
| 3,857,793 | 12/1974 | Pappalardo et al. | 252/301.17 |
| 3,960,756 | 6/1976 | Noakes | 252/301.18 |
| 4,066,908 | 1/1978 | Farukhi et al. | 250/483.1 |

FOREIGN PATENT DOCUMENTS 1087324 2/1955 France ........................ 252/301.36

OTHER PUBLICATIONS

Stevels et al., Philips Research Reports, vol. 30, No. 5, pp. 277–290, 10/75.

*Primary Examiner*—F. Edmundson
*Attorney, Agent, or Firm*—Marvin Snyder; James C. Davis, Jr.

[57] ABSTRACT

Scintillator structures are disclosed in which the phosphor is embedded or suspended in an optically transparent matrix which is selected or adjusted to have an index of refraction which is approximately equal to that of the phosphor embedded therein at the wavelength of the light emitted by the phosphor. In accordance with one embodiment of the invention, BaFCl:Eu is embedded in a matrix formed by the polymerization of 2-vinyl napthalene and vinyl toluene. The scintillator structures of the present invention provide superior optical coupling to photoelectrically responsive devices. Also disclosed are methods for manufacturing index-matched phosphor scintillator structures.

6 Claims, 3 Drawing Figures

INDEX-MATCHED PHOSPHOR SCINTILLATOR STRUCTURES

This application is a division, of application Ser. No. 169,023, filed July 15, 1980, now U.S. Pat. No. 4,316,817 which is a continuation-in-part of Ser. No. 863,876 filed Dec. 23, 1977, now abandoned.

BACKGROUND OF THE INVENTION

This invention relates to scintillator structures and methods for manufacturing such structures. More particularly, this invention relates to a method of enhancing the escape of visible wavelength radiation from the scintillator structure by matching the index of refraction of the phosphor particles embedded therein with the index of refraction of the optically transparent matrix in which the phosphor is embedded.

In general, a scintillator is a material which emits electromagnetic radiation in the visible spectrum when stimulated by high energy electromagnetic photons such as those in the x-ray or gamma-ray regions of the spectrum, hereinafter referred to as supra-optical frequencies. Thus, these materials are excellent choices for use as detectors in industrial or medical x-ray or gamma-ray equipment. In most typical applications, the light output from scintillator materials is made to impinge upon photoelectrically responsive materials in order to produce an electrical output signal which is in direct relation to the intensity of the initial x-ray or gamma-ray bombardment.

Scintillator materials comprise a major portion of those devices used to detect the presence and intensity of incident high energy photons. The other commonly used detector is the high pressure noble gas ionization device. This other form of high energy photon detector typically contains a gas, such as xenon, at a high pressure (density), which ionizes to a certain extent when subjected to high energy x-ray or gamma-ray radiation. This ionization causes a certain amount of current flow between the cathode and the anode of these detectors which are kept at a relatively high and opposite polarity from one another. The current that flows is sensed by a current sensing circuit whose output is reflective of the intensity of the high energy radiation. Since the high pressure noble gas detector operates on an ionization principle, after the termination of the irradiating energy, there still persists the possibility that a given ionization path remains open through which an undesirable leakage current may pass. Hence, these detectors are peculiarly sensitive to a form of "afterglow" or persistence similar to that found in certain scintillating phosphors. This persistence results in the blurring in the time dimension of the information contained in the irradiating signal.

In general, it is desirable that the amount of light (visible or near visible wavelength) output from these scintillators be as large as possible for a given amount of x-ray or gamma-ray bombardment. This is particularly true in the medical tomography area where it is desired that the energy intensity of the x-ray be as small as possible to minimize the danger to the patient. For this reason the phosphor scintillator should have a good luminescent efficiency.

Another important property that scintillator materials should possess is that of a short afterglow or persistence. This means that there should be a relatively short period of time between the termination of the high energy radiating excitation and the cessation of light output from the scintillator. If this is not the case, there is resultant blurring, in time, of the information-bearing signal. Furthermore, if a rapid scanning is desired, as it is in certain computerized tomographic applications, the presence of the afterglow tends to severely limit the scan rate, thereby rendering difficult the viewing of moving bodily organs, such as the heart or lungs.

A scintillator body or substance, in order to be effective, must be a good converter of high energy radiation (that is, x-rays and gamma-rays). Typically, present scintillator bodies consists of a phosphor in a powder or crystalline form. In this form, the useful light that is produced upon high energy excitation is limited to that which is generated in the surface regions of the body and that which can escape the interior of the scintillator body. This escape is difficult due to multiple internal reflections, each such reflection further attentuating the amount of light externally available by allowing considerably more traversal of phosphor than desired. Thus, it is necessary that not only the phosphors themselves have a good luminescent efficiency but it is also necessary that the light output be available for detection.

In the copending application of Dominic A. Cusano and Jerome S. Prener, Ser. No. 853,086, now U.S. Pat. No. 4,230,510, assigned to the same assignee as this invention, there is described distributed phosphor scintillator structures in which the phosphor is either embedded in an optically transparent matrix or in which the phosphor occurs in a layered structure with alternating layers of phosphor and optically transparent laminate material. This copending application is incorporated by reference herein. In this prior copending application there is still the problem that light rays generated within the scintillator body are refracted and reflected amongst the embedded phosphor particles as a result of the fact that there is a difference in the index of refraction between the phosphor particles and the matrix medium in which they are embedded. This mismatch results in a certain loss of efficiency as measured by light energy escaping the scintillator body.

The term "optical transparency" as used above and hereafter refers to the transparency of the scintillator body or material at or near the wavelength of light emitted by the phosphor or by a single or final wavelength conversion material in the embodiment wherein more than one wavelength conversion material is added. It is to be further noted that the index of refraction of light transmissive materials is in general dependent upon the wavelength of the transmitted light. Thus, the mismatch of indices of refraction mentioned above is a mismatch which is dependent upon the wavelength of light under consideration.

In particular, in the medical tomography area, where the intensity of x-radiation is modulated by the body through which it passes, and which modulated radiation is then converted into electrical signals, it is important to have x-ray detection devices which have as good overall energy conversion efficiency as possible. For devices with low efficiency, a higher flux of x-ray radiation must be applied to produce the same light and electrical output from the overall scintillation detector system. In the context of medical tomography, this means that such systems have a low signal-to-noise ratio.

SUMMARY OF THE INVENTION

In accordance with one embodiment of the invention, a phosphor is embedded in an optically transparent matrix which has been selected or adjusted to have an index of refraction approximately equal to the index of refraction of the phosphor at or near the wavelength of the optical output of the phosphor. The matrix material in which the phosphor is embedded is either a solid, or a liquid in which the phosphor is suspended. In accordance with one embodiment of the present invention, the phosphor is mixed with two monomers and the resulting mixture is then polymerized in a heat treatment process to form a solid scintillator body. In accordance with another embodiment of the present invention, the phosphor is mixed with a pulverized polymer and is heated under pressure to form an optically transparent scintillator body. In still another embodiment the phosphor is mixed with a solution in which the polymer has been dissolved; the solution is then freeze-dried to remove the solvent; the resulting powder is pulverized and then heated under pressure to form an optically transparent scintillator body.

In the scintillator bodies of the present invention, the boundaries between the phosphor particles and the matrix in which they are embedded or suspended are practically invisible to the light rays generated by absorption of a high energy photon. Hence, the resulting light paths from the absorption event to the exterior of the scintillator body are relatively straight with little reflection or refraction at the boundaries of the phosphor particles.

Accordingly, it is an object of this invention to provide a transparent matrix surrounding and supporting scintillator phosphor particles which is matched to the index of refraction of the phosphor particles.

It is therefore, a further object of this invention to provide scintillator bodies having a superior optical output.

DETAILED DESCRIPTION OF THE INVENTION

Figure 1:
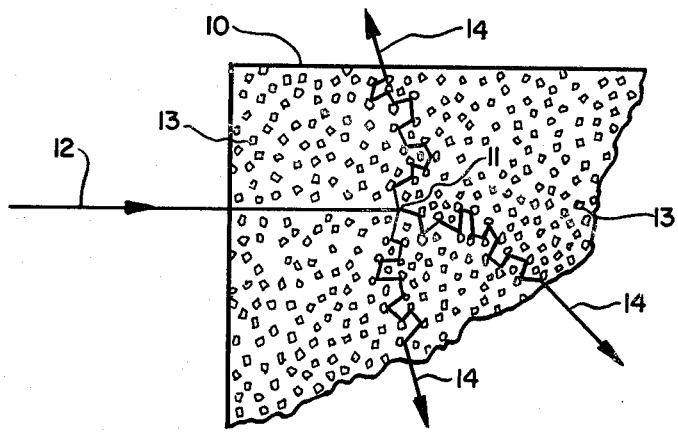
FIG. 1 is a side elevation sectional view illustrating the optical behavior of prior art scintillator bodies.

FIG. 1 illustrates the operation of a scintillator body composed of a powder or polycrystalline phosphor material. In this prior art form of scintillator body a high energy gamma-ray or x-ray photon 12 is absorbed at absorption site 11 inside the scintillator body and is converted into multiple lower energy optical wavelength photons in the visible or near visible (ultraviolet or infrared) regions depending upon the phosphor 13 used. Because of the difference in the index of refraction between the phosphor particles 13 and any air or interstitial matter between the phosphor particles or crystals, the resultant light paths 14 followed by the optical wavelength photons is quite tortured. At each such transition that the optical wavelength photon encounters, the refraction and reflection that occurs causes a certain loss of optical energy. Because the light paths 14 are so tortured and long, many optical energy dissipating interactions occur, in both the phosphor itself and the binder or matrix, resulting in a cumulative loss of optical output energy from the scintillator body 10.

Figure 2:
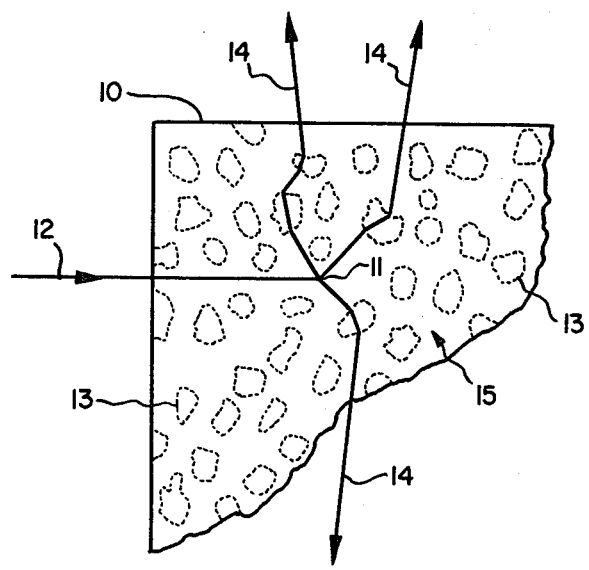
FIG. 2 is a side elevation sectional view of the scintillator body of the present invention illustrating the effect of the high energy absorption event.

FIG. 2 is a side elevational sectional view illustrating the operation of a scintillator body 10 of the present invention. Here a high energy x-ray or gamma-ray 12 is absorbed at absorption site 11 within the scintillator body 10 and here as in the prior art, multiple lower energy optical wavelength photons are emitted in the visible or near visible (ultraviolet and infrared) regions depending upon the phosphor employed. In the present invention, however, the phosphor particles 13 are embedded in a transparent matrix material 15 which material is index-matched to the particular phosphor employed. Because the indices of refraction are matched to the phosphor, the phosphor/matrix boundary is invisible or nearly invisible to the optical wavelength photons, resulting in less distorted and convoluted light paths 14. As a direct consequence of this index-matching, the optical output energy is more readily directed to the exterior of the scintillator body for detection, than is the light output in the prior art device shown in FIG. 1. A scintillator structure similar to that of FIG. 2 in which supportive matrix material is transparent but is not index-matched to the phosphor material, also will not have as great an amount of detectable optical output.

As mentioned above, it is important that the phosphor material have a good luminescent efficiency, that is, it should be able to convert as much of the x-ray or gamma-ray input energy into optical output energy as possible. This efficiency property is desirable for scintillator bodies in general but in particular when scintillator bodies are used in computerized tomography and even more particularly when they are used in the tomographic imaging of moving bodily organs, it is also important that the phosphor have a short afterglow. For general tomographic applications, it is desirable that the optical output of the scintillator body decay to 0.1 percent of its peak output within 5 milliseconds of the termination of the high energy excitation. Moreover, in tomographic applications involving moving bodily organs, it is desirable that this decay to within 0.1 percent of its peak value occur within 1 millisecond of the termination of the high energy excitation.

Figure 3:
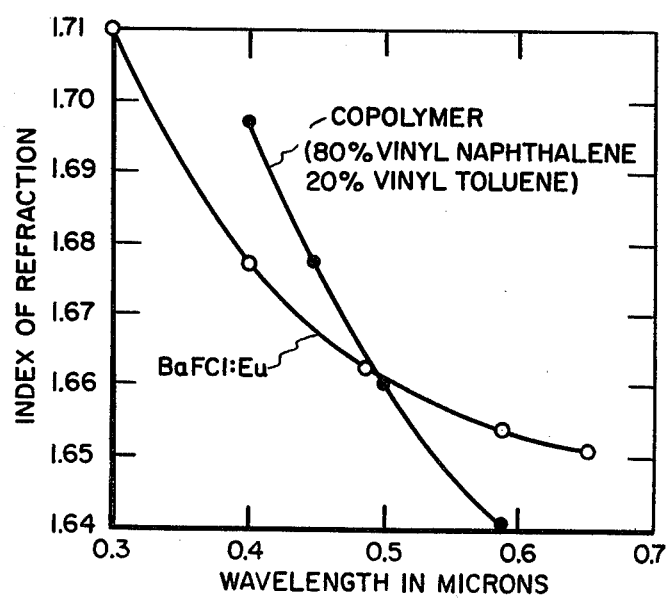
FIG. 3 is a graph of the indices of refraction as a function of light wavelength for a particular phosphor and a particular index-matched transparent matrix material.

A phosphor that is particularly suited to these tomographic applications is barium fluorochloride with a europium activator, BaFCl:Eu. Another important property of BaFCl:Eu is its relatively low index of refraction which is approximately 1.66 at a wavelength of approximately 4,800 Å as shown in FIG. 3. Other suitable phosphor materials include calcium fluoride ($CaF_2$) with an index of refraction of 1.43, barium fluoride ($BaF_2$) with an index of refraction of 1.47, cesium fluoride ($CsF_2$) with an index of refraction of 1.48, zinc silicate ($Zn_2SiO_4$) with an index of refraction of 1.62, potassium iodide (KI) with an index of refraction of 1.68, and cesium iodide (CsI) with an index of refraction of 1.78; the aforementioned indices of refraction in each case are measured at the light wavelength of the output of the corresponding phosphor. In the case of BaFCl:Eu, Eu activator is typically present to the extent of approximately 1 mole percent but may be present in the range from approximately 0.1 mole percent to approximately 5 mole percent.

Likewise there are certain criteria that the transparent matrix material should possess. It should be initially noted that when the matrix is described herein as being transparent, it is meant that it is transparent at the optical wavelength of interest (see FIG. 3). In the event that one or more wavelength conversions are employed to better match the optical output of the phosphor to the sensitive spectral regions of a suitable photoelectrically responsive device, then the transparency referred to applies at only the final wavelength region.

Another important property that the matrix material should possess is that it be capable of supporting the phosphor particles in a stable position with respect to the boundaries of the scintillator body. If the matrix is formed from a polymer or copolymer which hardens upon processing, this mechanical positional stability is not a problem. However, if the transparent matrix material is and remains in liquid form, it should have an appropriate density or be otherwise capable of holding the phosphor particles in a stable suspension.

In all embodiments of the present invention, however, the paramount property of the transparent matrix material is that it be selected or caused to have an index of refraction approximately equal to that of the scintillation phosphor. For example, a single monomer substance which is not reactive with the phosphor employed, and which has an index of refraction approximately equal to that of the phosphor, may be mixed with the phosphor before polymerization thereby forming the scintillator body with the desired high optical output. If a single polymer substance cannot be found with the desired properties, then two monomers may be used, one having a higher index of refraction and the other having a lower index of refraction. The index of refraction of the resultant copolymerized material is controlled by the relative proportions of the two copolymer materials used, the resultant index of refraction being approximately linearly related to the amount of the copolymers present. If this method of index refraction control is limited by the inability of the monomers to polymerize when mixed in the proportions needed to achieve the desired index of refraction then a different monomer set is selected.

In one embodiment of the present invention, the phosphor particles are suspended in a matrix of a low temperature inorganic glass such as the oxides of silicon, aluminum, lithium, boron, and phosphorous, all of which are low Z materials and highly non-absorptive of x-radiation.

In another embodiment of the present invention, the phosphor particles are suspended in a liquid solution. For example, 1-bromonaphthalene has an index of refraction close to that of BaFCl:Eu and is useful as a transparent supportive matrix material. However, 1-bromonaphthalene does have an index of refractive slightly lower than that of BaFCl:Eu, but 1-bromonaphthalene may be mixed with methylene iodide which has an index of refraction of approximately 1.74, the use of which in appropriate amounts permits a much closer index-matching to this particular phosphor. An appropriate solution of 1-iodonaphthalene (index of refraction approximately 1.68) and styrene (index of refraction approximately 1.55) may also be used as a transparent supportive matrix material for the BaFCl:Eu phosphor. Moreover, entire sets of liquids (non-polymers) are commercially available with various indices of refraction which can be mixed pair-wise one with another to produce liquids of any desired index of refraction. Such liquids are available, for example, from R. P. Cargill Laboratories, Inc., of Cedar Grove, N.J.

In accordance with one embodiment of the invention, the phosphor is mixed with two monomers to be polymerized. The mixture is then heated to achieve the polymerization. For example, BaFCl-Eu is mixed with 2-vinyl naphthalene and vinyl toluene and heated under vacuum at a temperature between 60° C., which is the melting point of the 2-vinyl naphthalene, and 125° C. If desired, prior to thermal polymerization, the mixture is centrifuged to achieve a greater phosphor particle density in one region of the mixture volume. Upon polymerization, the region of greater phosphor particle density results in a superior scintillator material. In the phosphor monomer mixture just described, settling by gravity alone produces a 35 percent volume utilization by the phosphor but if centrifuging is performed prior to polymerization, a 50 percent volume utilization by the phosphor is produced. This difference in phosphor density also produces a change in the x-ray absorption coefficient for 60 kev x-rays. In particular, the 50 percent volume utilization results in a coefficient of 1.40 per mm, and the 35 percent volume utilization results in a coefficient of 0.98 per mm.

It is not necessary, however, that the phosphor be mixed initially with the monomer or monomers involved. For example, if the phosphor chosen is reactive with any of the monomers, a different process is utilized beginning with the polymer instead of the monomers. Accordingly, in another embodiment of this invention, the copolymer and any wavelength conversion dyes, if desired, are dissolved in a solvent, such as benzene. To this solution, the phosphor is added and mixed thoroughly. This mixture is then freeze-dried to remove the solvent and to produce a homogeneous powder of phosphor particles encapsulated in the copolymer. This powder is then ground to break up any large aggregates of particles and mixed to insure a homogeneous particle size distribution throughout the sample. This powder is then heated to or slightly above the softening point (glass transition temperature) of the plastic copolymer and a sufficient pressure is provided to cause the copolymer surrounding the phosphor particles to flow, transforming the material into a single solid body with phosphor particles suspended therein. By way of example, for the situation in which the phosphor selected is BaFCl:Eu and the monomers are vinyl toluene and 2-vinyl naphthalene, the final vinyl toluene/vinyl naphthalene copolymer matrix is first formed and it is this that is dissolved in the benzene. For these particular materials, the softening point for the copolymer is between approximately 125° C. and approximately 180° C. and a suitable pressure for causing this material to flow is between approximately 10,000 and approximately 15,000 pounds per square inch. The temperature must not be permitted to rise so high as to cause decomposition of any component.

It is to be noted, that as used herein the term "polymer" also includes copolymers formed from a plurality of monomers and is not just applicable to the situation in which a polymer is formed from a single monomer.

In still another embodiment of the present invention, it is possible to use the polymerized monomer or monomers rather than mixing the phosphor with the monomer before polymerization. In this embodiment, the polymer or copolymer is preground in a suitable mill with fluorescent dyes incorporated, if desired. This powder is uniformly mixed with powdered phosphor material and this mixture is then heated to the softening point with sufficient pressure to cause the copolymer to flow. This process also results in a scintillator body with superior optical output.

In those situations where the optical output of the phosphor material does not match the sensitive ranges of the photoelectrically responsive detectors, it is desirable to incorporate within or around the scintillator body wavelength conversion material or materials which absorb photons at the wavelength of the light output of the phosphor material and emit photons at a different wavelength closer to the spectral region in which the photoelectrically responsive detector is most sensitive. The conversion efficency of many of the fluorescent dyes that are used as wavelength conversion materials is extremely high, most of them ranging between an efficiency ratio of 94 to 100 percent. In appropriate circumstances, multiple fluorescent dyes may be provided to produce several wavelength conversions in order that the scintillator output is optimally matched to the light detection means. For example, wavelength conversion substances are typically used in those cases in which the light output of a phosphor is in the blue to ultraviolet region of the spectrum and the detection means is a photodiode which is optimally responsive in the red to orange region of the spectrum.

In accordance with the embodiments of the present invention, there are several locations in which these wavelength conversion materials are used. First, the wavelength conversion substance may be added, if desired, in a jacket surrounding the scintillator body such as in the structure described in FIG. 3 of patent application Ser. No. 853,086, filed Nov. 21, 1977, by Cusano et al., now allowed. Second, in accordance with one embodiment of the present invention, the wavelength conversion material is mixed with the monomer before the scintillating phosphor is added. Third, in accordance with another embodiment of the invention, the wavelength conversion substance is incorporated in the polymer or copolymer prior to pulverizing the polymer or copolymer. Fourth, a wavelength conversion substance may be applied as a coating on the photoelectric detector; for example, magnesium germanate doped with manganese ($Mg_2GeO_4:Mn$) is typically added as a photodiode coating since it is not readily soluable in plastic and is itself an absorber of x-rays; however, $Mg_2GeO_4:Mn$ emits light in the red to orange region of the spectrum to which photodiode detectors are particularly sensitive.

By way of example, when the scintillator phosphor of choice is BaFCl:Eu which has an optical output peak at approximately 3,850 Å, a two-step wavelength conversion is accomplished by the addition of two fluroescent dyes to shift the optical output toward the red-orange region of the spectrum for more optimal detection by photodiodes. In particular, the first fluorescent dye employed is p-bis [2-(4-methyl-5-phenyloxazolyl)] benzene, more simply known as "dimethyl POPOP." This first dye shifts the optical output to approximately 4,250 Å. A second dye, perylene is utilized, further shifting the radiation to approximately 4,680 Å. An alternative choice for the second fluorescent dye to be added is 9,10 bis(phenylethynyl) antracene (BPEA), which is utilized to shift the wavelength to approximately 5,000 Å with an efficiency of between 95 percent and 100 percent. The efficiency of the dimethyl POPOP itself is approximately 95 percent and the efficiency of the perylene is approximately 94 percent. These high efficiencies in a double wavelength conversion process therefore result in net degradation in overall efficiency of no more than a factor of 0.80, which is more than offset by the increased sensitivity of a photodiode type detector. All of the dyes mentioned in this example are of an aromatic nature and are therefore soluble in and compatible with the monomers (vinyl toluene and vinyl naphthalene) described above. However, other suitable dyes may be employed and, like the ones mentioned in the example, may be incorporated within the scintillator body or incorporated within jackets surrounding the scintillator body. These other dyes include rhodamine-B with an efficiency of approximately 95 percent and BPEA also with an efficiency of approximately 95 percent. The principal criteria for the selection of these dyes, other than the particular wavelength shift which they provide, is that they be efficient and highly absorptive of emitted radiation.

By way of further example, a scintillator body is prepared by mixing 10 grams of 2-vinyl naphthalene with 3 grams of vinyl toluene. To these monomers is added 63 milligrams of dimethyl POPOP and 31 milligrams of perylene. This mixture is then introduced into a vessel containing 8 grams of BaFCl:Eu powder and the entire mixture is thermally polymerized under vacuum at a temperture between approximately 60° C. and 125° C. If desired, before polymerization, the mixture is centrifuged to increase the density of the BaFCl:Eu phosphor in one region of the mixture volume.

While the above invention has been particularly described in terms of the BaFCl:Eu phosphor and in terms of computerized tomographic applications, the invention is not so limited. For example, it is applicable in industrial applications where higher energy gamma radiation is employed and is in general applicable whenever increased optical output is desired from a scintillator structure.

While this invention has been described with reference to particular embodiments and examples, other modifications and variations will occur to those skilled in the art in view of the above teachings. Accordingly, it should be understood that within the scope of the appended claims, the invention may be practiced otherwise than is specifically described.

The invention claimed is:
1. A method of producing scintillator bodies for use in computerized tomography with increased detectable optical output from a phosphor which absorbs electromagnetic radiation at supra-optical frequencies and emits electromagnetic radiation at optical frequencies, said method comprising the steps of:

(A) pulverizing a polyvinyl naphthalene toluene polymer having an index of refraction equal to the index of refraction of BaFCl:Eu phosphor, at approximately the wavelength of the optical emission of the phosphor, said polymer being substantially transparent to the optical wavelength radiation emitted by the phosphor and also being substantially transparent to supra-optical electromagnetic radiation;

(B) uniformly mixing the pulverized polymer with the phosphor;

(C) heating the powder from step B at a sufficiently high temperature and pressure to cause the polymer to flow forming a solid body, but below a temperature so high as to cause decomposition of any component.

2. The method of claim 1 in which, in step C, the pressure applied is between approximately 10,000 and approximately 15,000 pounds per square inch and the temperature is between approximately 125° C. and approximately 180° C.

3. The method of claim 1 in which at least one wavelength conversion substance is incorporated in the polymer of step A.

4. The method of claim 1 in which p-bis[2-(4 methyl-5-phenyloxazolyl)] benzene is included as a first wavelength conversion material and a fluorescent dye, selected from the group consisting of perylene and 9,10 bis(phenylethynyl) anthracene, is included as a second wavelength conversion material.

5. The method of claim 3 in which the wavelength conversion substance is selected from the group consisting of rhodamine-B and 9,10 bis(phenylethynyl) anthracene.

6. The scintillator body produced in accordance with claim 1.

* * * * *